United States Patent [19]

Didycz et al.

[11] 4,104,131
[45] Aug. 1, 1978

[54] PROCESS FOR SEPARATING AMMONIA AND ACID GASES FROM WASTE WATERS CONTAINING FIXED AMMONIA SALTS

[75] Inventors: William J. Didycz, Whitehall Borough; Donald Glassman, Mount Lebanon Borough; Edward E. Maier, Plum Borough; George T. Saniga, Penn Hills Township, Alleghany County, all of Pa.

[73] Assignee: United States Steel Corporation, Pittsburgh, Pa.

[21] Appl. No.: 703,407

[22] Filed: Jul. 8, 1976

[51] Int. Cl.² ............................................. B01D 3/38
[52] U.S. Cl. .......................................... 203/7; 203/10; 203/36; 203/37; 203/47; 203/85; 203/96; 210/58; 423/357
[58] Field of Search .................. 203/10, 11, 7, 36, 71, 203/84, 85, 79, 78, 25, 49, 47, 33, 37, 92, 93, 96, 95, 97; 423/356, 357; 210/58

[56] References Cited

U.S. PATENT DOCUMENTS

| | | | |
|---|---|---|---|
| 1,905,108 | 4/1933 | Koppers | 423/357 |
| 1,928,510 | 9/1933 | Sperr | 423/357 |
| 2,029,467 | 2/1936 | Day | 203/36 |
| 2,156,843 | 5/1939 | Garrels et al. | 203/36 |
| 2,635,073 | 4/1953 | McIntire | 203/36 |
| 2,781,244 | 2/1957 | Hecklinger | 423/357 |
| 2,839,369 | 6/1958 | Mullins | 423/357 |
| 2,892,682 | 6/1959 | Svanoe | 423/357 |
| 3,278,423 | 10/1966 | Millar | 203/36 |
| 3,336,221 | 8/1967 | Ralston | 210/58 |
| 3,434,969 | 3/1969 | Ralston | 210/58 |

Primary Examiner—Wilbur L. Bascomb, Jr.
Attorney, Agent, or Firm—W. Gary Goodson

[57] ABSTRACT

A water purification process is described for the removal of ammonia and optionally one or more acid gases from waste waters such as coke-plant or coal conversion waste waters. The process involves adding lime to these waste waters in amounts sufficient to react with fixed ammonia salts present in the waste water and to enable substantial amounts of the ammonia to be evolved upon distillation, adding a threshold amount of a scale inhibitor compound chosen from the class of certain organic phosphonates and subjecting the thus treated waste water to distillation to remove substantial amounts of the ammonia and acid gases present from the waste water. Preferably, this process is achieved by two separate and successive distillations. In this preferred process, the first distillation substantially reduces the amount of the acid gases and free ammonia and is conducted at a pH of more than 9. In the second distillation, the amount of fixed ammonia is substantially reduced. To conserve energy, the stripping vapors from the second distillation are reused as stripping vapors for the first distillation.

38 Claims, 2 Drawing Figures

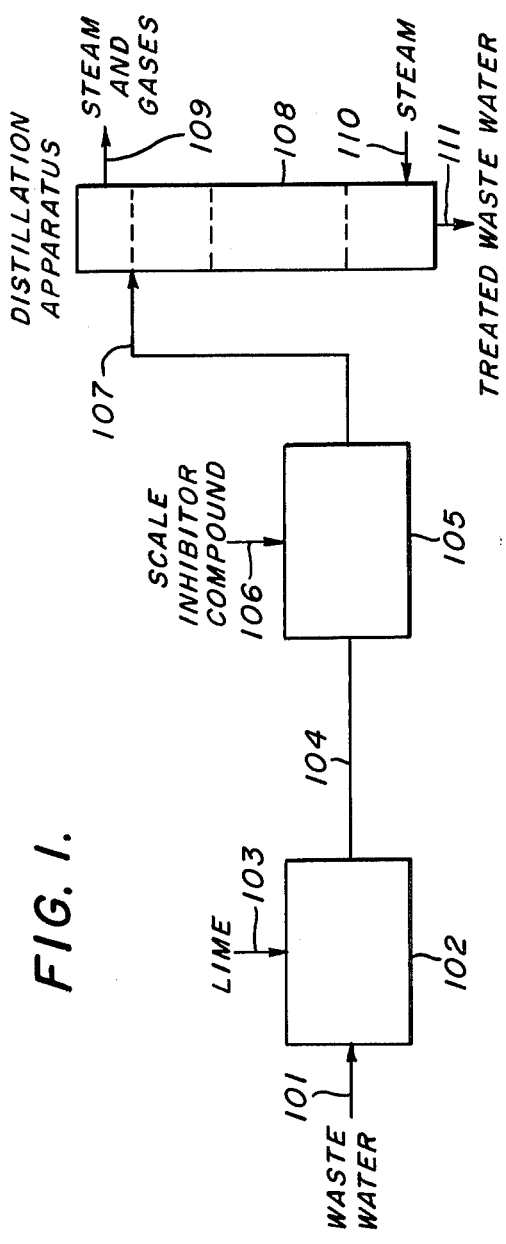
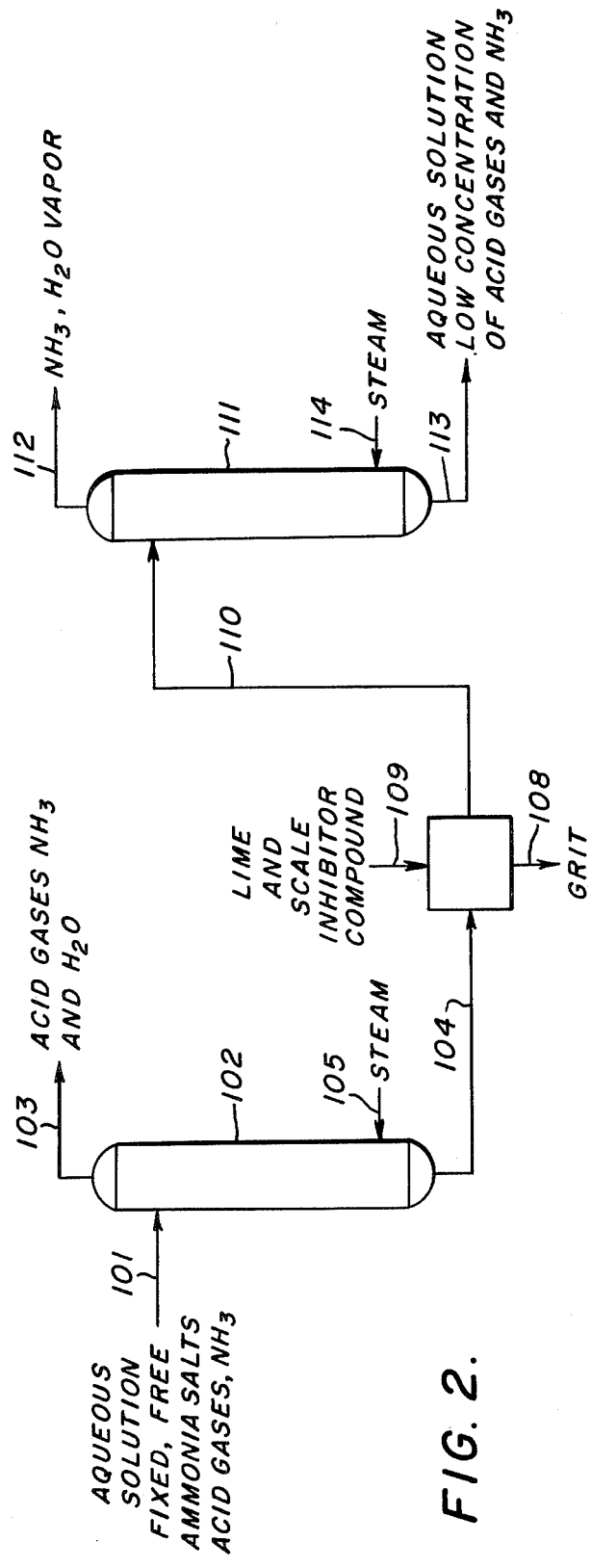
FIG. 1.
FIG. 2.

PROCESS FOR SEPARATING AMMONIA AND ACID GASES FROM WASTE WATERS CONTAINING FIXED AMMONIA SALTS

BACKGROUND OF THE INVENTION

Aqueous solutions containing ammonium compounds and especially "fixed ammonia" and optionally acid gases are a common waste water which requires purification. Such a waste water is produced as a by-product from coal carbonization plants. The need for such purification has become increasingly important due to the emphasis today on clean air and clean water. If the waste water is to be discharged into a river or a stream, it is obviously necessary to reduce the noxious or toxic properties of the waste water. On the other hand, in a coal carbonization plant it is often desirable to reuse the waste water to "quench" the hot coke from the coke ovens. If these waste waters contain noxious or toxic materials, then there may be a serious air pollution problem.

A common way of removing impurities from these waste waters is by means of a two-step distillation process using distillation apparatus with a free ammonia and a fixed ammonia section. See "Industrial Chemistry," E. R. Riegel, Reinhold Publishing Corp., N.Y., 1942, pp. 265-268.

One of the serious problems of this two-step distillation process is the fouling of the fixed ammonia still section by deposits of solids formed in the waste waters upon the lime addition. The free ammonia portion of the distillation apparatus removes most of the free ammonia and/or acid gases present in the waste water. The waste water is then treated with lime to convert the fixed ammonia to free ammonia which is then removed in the fixed ammonia still portion of the distillation apparatus. Solids deposit on the trays in the fixed ammonia still so that periodic cleaning is necessary to allow efficient operation of the still. This is costly and time-consuming and also cuts down on the production possible from a given facility. A number of attempts have been made to overcome this problem. In U.S. Pat. No. 2,839,369 an attempt is made to remedy the problem by designing a special still which can be easily cleaned. A further approach is described in U.S. Pat. No. 3,278,423 wherein the waste waters are first treated in a free ammonia still to remove most of the free ammonia, then phenols and the like are removed by biochemical oxidation, then lime is added to the thus treated waste waters to convert the fixed ammonia to free ammonia, then substantially all of the solids are separated from the lime-containing waste water and then the thus treated waste water is steam distilled to remove the free ammonia thus produced. This process has the disadvantage of requiring substantial lime consumption and results in a large amount of sludge which creates serious handling and disposal problems. Furthermore, the biochemical oxidation step may have serious operating problems since many biochemical oxidation plants will not work if the waste water being treated contains more than about 500 parts per million by weight of total ammonia. Total ammonia includes both free ammonia and fixed ammonia. Thus, in cases where significant total ammonia is present, the waste waters would require considerable dilution for efficient operation of the biochemical oxidation part of the process, thus increasing the size of equipment and therefore the cost of such equipment.

The term "fixed ammonia salts" is used herein in its generally accepted meaning to cover those compounds of ammonia which are not decomposed by heat alone at the temperature employed in the ammonia still, but which in alkaline solution yield free ammonia. Generally, in coke-plant waste waters, the major portion of the fixed ammonia is present as ammonium chloride. Other such compounds are ammonium thiosulfate, ammonium thiocyanate, ammonium ferrocyanide and ammonium sulfate. The term "fixed ammonia" refers to the ammonia portion of the fixed ammonia salts.

The term "free ammonia salts[ as used herein is meant to include ammonia itself and also those compounds present in waste waters from which ammonia is liberated by heat in the free ammonia still. Such compounds are ammonium carbonate, ammonium bicarbonate, ammonium sulfide, ammonium bisulfide, ammonium cyanide and ammonium carbamate. The term "free ammonia" refers to ammonia or the ammonia portion of the free ammonia salts.

The term "lime" is used herein to include any of the various chemical and physical forms of quicklime (calcium oxide), hydrated lime (calcium hydroxide), and hydraulic lime. The lime may include a number of impurities such as silica, calcium carbonate, magnesium oxide, iron oxide and aluminum oxide. Some of them may be insoluble when added to the waste water.

The term "acid gases" is used herein to include hydrogen cyanide, hydrogen sulfide and carbon dioxide. These gases may be present in the original waste water as weak ammonium salts that completely dissociate into ammonia and their respective acid gases upon steam distillation.

The waste waters described herein are generally industrial waste waters produced by the high-temperature cracking of carbonaceous material. Often such carbonaceous materials are coal or petroleum products. Waste water may also be formed in water-scrubbing of coke-oven gases.

BRIEF DESCRIPTION OF THE INVENTION AND FIGURES

This process comprises adding lime to waste waters in amounts sufficient to react with the fixed ammonia salts therein, thereby allowing substantially all of the ammonia to be evolved upon distillation, adding a threshold amount of a scale inhibitor compound of the general formula

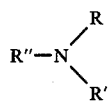

whrere R is

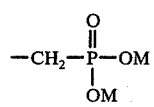

R' is selected from the group consisting of R and —CH$_2$CH$_2$OH, and R" is selected from the group consisting of R, —CH$_2$CH$_2$OH, and

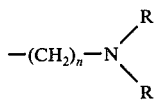

where each M is independently selected from the group consisting of H, $NH_4$ and alkali metal, "n" is a whole number from 1 to 3, and subjecting the thus treated waste water to distillation to remove substantial amounts of the ammonia and acid gases from the waste water.

Preferably, this process is achieved by two separate and successive distillations and comprises separating acid gases and ammonia from a dilute aqueous solution thereof, the solution also containing free and fixed ammonia salts. This solution is subjected to a first countercurrent multi-stage continuous distillation, the distillation being conducted by having a gradient of ammonia concentration decreasing towards the region of bottom liquid removal which results in the bottom liquid having a pH of more than 9 when measured at 50° C. An overhead vapor stream from this distillation contains a major proportion of stripping vapor, and some of the acid gases in the solution, and some of the ammonia from the free ammonia salts. An aqueous bottom stream from this first distillation contains a major proportion of water and substantially all of the fixed ammonia salts. Lime is then added to the bottom stream in an amount sufficient to form an insoluble precipitate and evolve ammonia contained in the fixed ammonia salts during a second distillation of the mixture. A threshold amount of at least one scale inhibitor compound of the above mentioned general formula is added to the diluted aqueous solution to thereby inhibit the deposition of scale on the trays of the distillation towers and especially the tower in which the second distillation is conducted. This bottom stream is then subjected to a second countercurrent multi-stage continuous distillation whereby an overhead vapor stream is withdrawn containing a major proportion of stripping vapor and a major proportion of the ammonia from the fixed ammonia salts, and an aqueous bottom stream is drawn, such stream having a substantially reduced concentration of acid gases and ammonia as compared to the original aqueous solution. The overhead vapor stream from the second distillation is used as the stripping vapor and to provide heat in the first distillation.

The first distillation or other waste water pretreatment step may be eliminated so long as the composition of the waste water immediately prior to lime addition comprises:

(a) free ammonia in a concentration above about 3000 ppm (parts per million based on the total weight of the waste water) and preferably between about 3000 and about 100,000 ppm, (b) fixed ammonia in a concentration of between about 50 and about 50,000 ppm and preferably between about 3000 and about 5000 ppm, (c) acid gases in a concentration of between about 250 and about 50,000 ppm, and (d) sulfate ion in a concentration of less than about 1500 ppm and preferably less than about 800 ppm, the process comprising (a) adding lime to said waste water, said lime and fixed ammonia salts being present in amounts sufficient to form an insoluble precipitate and evolve ammonia contained in the fixed ammonia salts during a distillation of said mixture; (b) adding a threshold amount of at least one scale inhibitor compound of the above described general formula to said dilute aqueous solutions to thereby inhibit the deposition of scale on the trays of the distillation tower in which the distillation is conducted; (c) subjecting the thus treated waste water to a countercurrent multi-stage continuous distillation, (i) withdrawing an overhead vapor stream, said vapor stream containing a major proportion of stripping vapor and a portion of the ammonia from the fixed ammonia salts, (ii) withdrawing an aqueous bottom stream, said stream having a substantially reduced concentration of acid gases and ammonia as compared to said waste water. Carbon dioxide is a common acid gas that may be present in the waste water and immediately prior to lime addition in a concentration between about 250 and about 700 ppm.

The invention described herein also includes the apparatus for carrying out the described processes.

FIG. 1 is a flow diagram of the waste water purification process of this invention.

FIG. 2 is a flow diagram illustrating the basic principles of the preferred two distillation column process of this invention. By conducting the process as described, it has been found that the fouling or scale deposition on the trays of the distillation columns and particularly of the "fixed still" is substantially reduced.

DESCRIPTION OF THE PREFERRED EMBODIMENT(S)

The flow diagram of FIG. 1 shows waste water containing fixed ammonia and ions which upon reaction with lime produce water-insoluble compounds entering through inlet 101 into a vessel 102 where lime is added through inlet 103 preferably in the form of a lime-water slurry. The lime is added in at least sufficient amount to assure conversion of the fixed ammonia present to free ammonia upon subsequent distillation. The waste water is then passed from vessel 102 through line 104 to vessel 105 where a threshold amount of a scale inhibitor compound of the above described general formula is added through inlet 106. The waste water is then passed from vessel 105 through line 107 to the top of distillation apparatus 108 where stripping vapor is added to the bottom through inlet 110 and ammonia, steam and other gases are removed overhead through outlet 109. The treated waste water is removed through line 111. Major proportions of the contaminates except thiocyanate and organic materials such as phenol have then been removed from the waste water without any significant solids built up on the trays of distillation apparatus 108. Preferably at this point the water is then passed through a biochemical oxidation treatment plant and then discharged into streams, sewers or the like or, if desired, recycled for use such as for coke-quenching.

In FIG. 2, a flow diagram illustrates the principles of a preferred embodiment of this invention. The aqueous feed composition is a dilute solution of acid gases, ammonia, fixed ammonia salts, and free ammonia salts. This may be waste water from a coke-oven plant or coal conversion plant or similar installation. This solution flows by line 101 into a first distillation column 102. In this column, the solution is heated and its pH is maintained above 9 by the ammonia and water vapor leaving the second distillation column 111 through line 112 which is used as the stripping vapor for the first distillation column 102. In the distillation of a multi-component liquid, the upflowing vapor which becomes enriched with the more volatile components of the liquid is described as having a stripping action on the liquid, hence, this vapor is termed a stripping vapor. The stripping vapor may be a condensable gas or a non-condensable gas or a combination of these; e.g., steam, air, hydrogen, nitrogen, and methane. The stripping vapor may be generated by vaporization of the liquid or by injecting vapor into the distillation or by a combination of these. Because this invention concerns distillation of dilute aqueous streams, the stripping vapor will generally comprise a predominant proportion of steam. The vapor from line 112, however, generally is a major component of the stripping vapor of this invention due to the energy savings possible. The overhead vapor leaving the column by line 103 will have a major proportion of stripping vapor such as steam on substantial amounts of the acid gases and free ammonia. Heat for the first column can be provided by direct injection of steam or other stripping medium or a combination of these; as shown, steam or stripping vapor is directly injected into the column by line 105. From the first column, a bottom liquid is withdrawn by line 104 and mixed with lime and a threshold amount of the scale inhibitor compound of this invention in the chamber 108; also, grit and other readily separable solids such as precipitates can be removed in the chamber. This bottom liquid stream flows by line 110 to a second distillation column 111. In this column, the liquid is heated and an overhead vapor of ammonia and water is removed by line 112. The conditions in this second column are selected for maximum recovery of ammonia. This column can be heated by direct injection of stripping vapor such as steam or by other art recognized methods or by combinations of these; as shown, steam is withdrawn by line 113; it has low concentrations of the acid gases and ammonia. It is now suitable for further processing, an example of which is further treatment to provide a quality such that it can be discharged into rivers or reused as a process water. By utilizing the multiple distillation of this invention, low levels of toxic cyanides can be achieved in the effluent so that after biological oxidation, the treated water has such low levels of toxic substances that additional cyanide removal by way of chlorination or the like may be avoided.

The scale inhibitor compound of this invention is that of the above-mentioned general formula which is a well known class of scale inhibitor compounds as shown, for example, by U.S. Pat. No. 3,336,221, incorporated herein by reference. Preferably, the scale inhibitor compound is of the formula

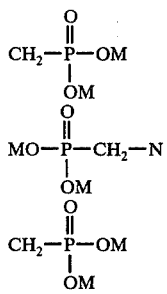

where each M is independently selected from the group consisting of H, $NH_4$, and alkali metal, the amount of said compound added being no more than a threshold amount up to about 200 ppm and in a weight ratio of said compound to the cation component of said scale-forming salts not in excess of 0.5 to 1.

Preferably, the concentration of scale inhibitor compound does not exceed 100 ppm, more preferably does not exceed 80 ppm and most preferably does not exceed about 20 ppm.

A preferred scale inhibitor compound is a water soluble alkali metal salt of an aminotri(lower alkylidene phosphonic acid) and more preferably the scale inhibitor compound is penta sodium aminotri(methylphosphonate).

The scale inhibitor compound of this invention may be added at a number of different points in the process such as prior to or during the first or second distillation. Usually it is preferred to add the scale inhibitor compound subsequent to the addition of the lime. The second distillation column of this invention, commonly referred to as the "fixed still" generally contains 5 to 10 trays. Preferably, these trays are dualflow trays, which are perforated trays without a downcomer (a separate channel for liquid). Therefore, in a dualflow tray the liquid and gas are forced to go countercurrent alternately through the same opening. These dualflow trays generally contain substantially circular holes having an average diameter of at least one-half inch and preferably between about one inch and about two inches. The trays generally have an average diameter of between about 3 and about 20 feet.

The scale inhibiting compound of this invention is that described by the previously mentioned general formula.

Generally, the dilute aqueous solutions which will be treated by this invention are those having acid gases and ammonia in the solution together with fixed and free ammonia salts. By dilute is meant solutions having water as its major component, where the total dissolved acid gases and fixed and free ammonia are up to 10 percent by weight. The acid gases include $CO_2$, HCN, and $H_2S$ or mixtures thereof. Any one of these may be present by itself or in combination with one or more of the others.

The most common dilute aqueous solutions will contain $CO_2$, $H_2S$, and HCN with $NH_3$ as well as the fixed and free ammonia salts; Van Krevelan et al, Recueil 68 (1949) pp. 191–216 describes the vapor pressures of such solutions as well as the ionic species of acid gas salts and ammonium compounds in such solutions, which would be representative of the aqueous solutions upon which the invention may be practiced. Commonly the acid gases and free and fixed ammonia comprise up to about 0.6% by weight of the aqueous solutions.

Where the solution is a waste water of streams collected from coke plants and coal conversion plants, other components may include tars, phenols, fluorides, chlorides, sulfates, thiosulfates, and thiocyanates. In these circumstances, the tars would be removed by decanting and then the ammonia and acid gases would be removed according to the subject invention.

The collected waste waters from coke or other coal conversion plants are often referred to as ammmoniacal liquors. The principal free and fixed salts present in the liquors are as follows:

| Free Salts | Fixed Salts |
| --- | --- |
| ammonium carbonate | ammonium chloride |
| ammonium bicarbonate | ammonium thiocyanate |
| ammonium sulfide | ammonium ferrocyanide |
| ammonium cyanide | ammonium thiosulfate |

| Free Salts | Fixed Salts |
|---|---|
|  | ammonium sulfate |

In addition to ammonia and ammonium salts, the waste waters contain low concentrations of suspended and dissolved tarry compounds. The most important of these compounds are the phenols or "tar acids", the concentration of which usually ranges from about 0.3 to about 15 grams per liter of liquor. Pyridine bases, neutral oils, and carboxylic acids are also present but in much lower concentrations.

The insoluble precipitates formed on the addition of lime to the waste water generally include calcium sulfate, calcium sulfite, calcium carbonate, calcium fluoride, calcium phosphate or mixtures of the same.

Typical compositions of liquors from various sections of the coke oven operation are:

Table I
Composition of Weak Ammonia Liquors From Several Coke Plants

|  | Ammonia-Recovery Process | | | |
|---|---|---|---|---|
|  | Semidirect | | Indirect | |
| Plant | A | B | C | D |
| Ammonia, total, gpl | 7.60 | 6.20 | 4.65 | 3.59 |
| Free, gpl | 4.20 | 4.76 | 3.37 | 2.70 |
| Fixed, gpl | 3.40 | 1.44 | 1.28 | 0.89 |
| Carbon dioxide as $CO_2$, gpl | 2.35 | 3.94 | 2.78 | 1.74 |
| Hydrogen sulfide as $H_2S$, gpl | 0.86 | 0.34 | 1.26 | 1.13 |
| Thiosulfate as $H_2S_2O_3$, gpl | 0.022 | 0.51 | | |
| Sulfite as $H_2SO_3$, gpl | 2.84 | | | |
| Sulfate as $H_2SO_4$, gpl |  | 0.15 | | |
| Chloride as HCl, gpl | 6.75 | 1.85 | | |
| Cyanide as HCN, gpl | 0.062 | 0.05 | | |
| Thiocyanate as HCNS, gpl | 0.36 | 0.42 | | |
| Ferrocyanide as $(NH_4)Fe(CN)_6$, gpl | 0.014 | 0.039 | | |
| Total sulfur, gpl | 1.014 | 0.57 | | |
| Phenols as $C_6H_5OH$, gpl | 0.66 | 3.07 | | |
| Pyridine bases as $C_5H_5N$, gpl | 0.48 | 0.16 | 1.27 | 0.98 |
| Organic number, cc N/50 $KMnO_4$ per liter |  |  | 4856 | 3368 |

Table II
Typical Compositions of Flushing and Primary Cooler Liquors

| Liquor | Flushing Liquor, gpl | Primary-Cooler Condensate, gpl |
|---|---|---|
| Total ammonia | 4.20 | 6.94 |
| "Free" ammonia | 1.65 | 6.36 |
| "Fixed" ammonia | 2.55 | 0.58 |
| Total sulfur | 0.668 | |
| Sulfate as sulfur trioxide | 0.212 | |
| Sulfide as hydrogen sulfide | 0.003 | |
| Ammonium thiosulfate | 0.229 | 0.29 |
| Carbonate as carbon dioxide | 0.374 | |
| Cyanide as hydrogen cyanide | 0.002 | |
| Chloride as chlorine | 8.13 | 1.05 |
| Ammonium thiocyanate | 0.82 | |
| Phenols | 3.55 | 3.20 |

A fuller discussion of the recovery of ammonia from coke oven gases and the origin of the various ammonia salt species in the various sections of coke oven plants is given in the book, COAL, COKE AND COAL CHEMICALS, P. J. Wilson and J. H. Wells, McGraw-Hill Book Company, Inc., N.Y., 1950, particularly Chapter 10, pp. 304-325.

The following Table 3 illustrates the range of compositions in coke plant waste water that comprise aqueous solutions especially suitable for the practice of this invention:

Table 3
Typical Composition Ranges for Coke Plant Waste Water

| Component | Composition Range, ppm* | | | Typical Compositions, ppm* | | |
|---|---|---|---|---|---|---|
|  |  |  |  | Waste Water No. 1 | Waste Water No. 2 | Waste Water No. 3 |
| Free ammonia | 450 | to | 10000 | 1900 | 770 | 1350 |
| Fixed ammonia | 700 | to | 4000 | 1900 | 1190 | 2440 |
| Cyanide | 2 | to | 1000 | 210 | 35 | 65 |
| Sulfide | 0 | to | 1300 | 500 | 1 | 10 |
| Carbonate | 150 | to | 4000 | 2180 | 190 | 350 |
| Chloride | 750 | to | 8500 | 2300 | 1920 | 4460 |
| Sulfate/Sulfite | 150 | to | 3000 | 310 | 325 | 415 |
| Thiosulfate | 90 | to | 600 | 440 | 115 | 300 |
| Thiocyanate | 100 | to | 1000 | 700 | 150 | 310 |
| Total sulfur | 200 | to | 2000 | 1300 | 250 | 550 |
| Fluoride | 30 | to | 150 | 60 | 40 | 75 |
| Phenols | 300** | to | 3600 | 1500 | 400 | 725 |
| pH | 7 | to | 9.1 | 9.0 | 7.5 | 7.6 |

*Parts per million by weight.
**Dephenolized coke plant waste water could contain as little as 0.1 ppm phenols.

The practice of our invention on materials such as described above can be achieved by having two successive and separate continuous distillations each operating under countercurrent multi-stage separate conditions. In the first distillation, the process conditions are selected so that substantial amounts of the acid gases and of the ammonia from the free ammonia salts are vaporized and removed from the solution.

The inlet feed temperatures may be in the range of about 60°-212° F, the overhead temperatures in the range of about 140°-265° F, and the bottom temperatures in the range of about 160°-275° F. The first distillation will be conducted at a pressure in the range of about 0.3 to 3.0 atmos. abs. The low part of the pressure range allows for efficient use of low pressure steam while the higher pressures give more efficient removal of cyanides.

The lime reacts with both fixed ammonia salts and any residual acid gases. With respect to the ammonia salts, the principal reaction is with ammonium chloride although ammonium thiocyanide and sulfate also react according to the following equations:

$$2NH_4Cl + Ca(OH)_2 \rightarrow CaCl_2 + 2NH_3 + 2H_2O$$
$$2NH_4SCN + Ca(OH)_2 \rightarrow Ca(SCN)_2 + 2NH_3 + 2H_2O$$
$$(NH_4)_2SO_4 + Ca(OH)_2 \rightarrow CaSO_4 + 2NH_3 + 2H_2O$$

The reactions between lime and any residual acid gases are according to the following equations:

$$CO_2 + Ca(OH)_2$$
$$CaCO_3 + H_2O$$
$$H_2S + Ca(OH)_2$$
$$CaS + 2H_2O$$
$$2HCN + Ca(OH)_2$$
$$Ca(CN)_2 + 2H_2O$$

The major portion of any residual acid gases is $CO_2$ and the calcium carbonate thus formed tends to consume lime and forms distillation equipment.

The treated stream is subjected to a second distillation. As noted above, the high pH and heat cause the "fixed" ammonia salts to decompose with liberation of the ammonia. The resulting overhead vapors are essentially ammonia and water. The feed temperature may be in the range of about 155°–270° F, the overhead vapors may be at a temperature in the range of about 140°–290° F, and the bottom stream may be at a temperature in the range of about 160°–295° F. The pressure may be up to about 60 psia. The bottoms stream from the second distillation will have a low concentration of total ammonia and of cyanides. The pH will be in the range of 9.5–12. The total ammonia may be as low as 25 ppm. This bottom stream can be clarified and then treated to remove other organic materials, such as phenols.

The following examples illustrate the practice of the invention.

EXAMPLE 1

In an apparatus essentially as described in FIG. 2 except that the first distillation column (free still) and the second distillation column (fixed still) are physically combined into one tower such that the free still is immediately above the fixed still and a line from the top of the fixed still to the bottom of the free still allows the used stripping vapors from the fixed still to be reused as stripping vapors in the free still. The fixed still contains 9 dualflow trays. The waste water was received at a temperature of 130° F near the top of the free still. The ratio of steam rate to the second column to feed rate to the first column was about 1.60 lb/gal. The overhead vapors were at a temperature of 210° F and 17 psia. The pH in the free still was between about 9.5 and 12.

The concentrations of some of the acid gases and ammonia in the free still were as follows:

|  | Feed (ppm) | Bottoms (ppm) |
|---|---|---|
| $NH_3$ (free) | 2176 | 7310 |
| $NH_3$ (fixed) | 3536 | 3750 |
| $H_2S$ | 32 | ? |
| HCN | 60 | ? |

The overhead vapors were sent to a saturator for ammonia recovery.

The bottom stream from the free still was withdrawn and then treated with a slurry of lime in an aqueous vehicle so that its pH of 9.5–12 was maintained in the bottoms of the fixed still. A threshold amount of penta sodium aminotri(methylphosphonate) was added to this stream so that the concentration of such phosphonate in the stream was 30–40 ppm. Thereafter, the treated stream was fed to near the top of the fixed still. The overhead vapors from this column were sent to the bottom of the first column as stripping vapors. The bottom stream was at 226° F and 19 psia. Their compositions were as follows:

|  | Overhead Vol. % | Bottoms Wt. % |
|---|---|---|
| $H_2O$ | 91.67 | 99+ |
| $CO_2$ | — | — |
| $NH_3$(free) | 8.33 | .06 |
| $H_2S$ | — | ? |
| HCN (total)* | — | .0043 |

The bottom fraction from the fixed still was sent to a lime clarifier for disposal. The clarified bottom stream was then sent to a treatment where aerobic bacteria in the presence of oxygen to cause biological degradation of the reactive organic matter remaining in the water.

This example represents the reduction in ammonia content of more than 95 percent and in cyanide content of about 60 percent. After 1 year of operation there was essentially no build up of scale on the trays of the fixed still whereas using the conventional prior art process the scale builds up gradually until the trays are completely plugged up and require cleaning after about 6 months operation.

EXAMPLE 2

The process of Example 1 is repeated except that the sulfate ion is allowed to increase in the initial waste water feed. When the concentration of sulfate ion in the waste water feed reaches above about 1500 ppm, the trays in the fixed still very rapidly plug with scale.

It is within the practice of this invention to make use of such apparatus, to use additional materials and processes as would be familiar to those skilled in this art. For example, the first and second distillations may be performed in one or more vessels. Such variations are intended to be within the scope of the invention set forth in the claims.

We claim:

1. A process for separating acid gases and ammonia from a dilute aqueous solution thereof, said solution being derived from a coal conversion process and also containing free and fixed ammonia salts and sulfate ion in a concentration of less than about 1500 ppm, said process comprising:
   (a) subjecting said solution to a first countercurrent multi-stage continuous distillation, said distillation being conducted by having a gradient of ammonia concentration decreasing towards the region of bottom liquid withdrawal which results in said bottom liquid having a pH of more than 9,
     (i) withdrawing an overhead vapor stream containing a major proportion of stripping vapor, some of said acid gases from said solution, and some of the ammonia from said free ammonia salts,
     (ii) withdrawing an aqueous bottom stream which contains a major proportion of water, acid gases, free ammonia salts and substantially all of said fixed ammonia salts;
   (b) adding lime to said withdrawn bottom stream, said lime being added in an amount sufficient to form an insoluble precipitate and evolve ammonia contained in the fixed ammonia salts during a second distillation of said mixture;
   (c) adding a threshold amount of at least one scale inhibitor compound of the general formula

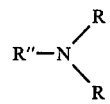

where R is

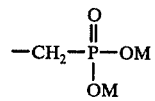

R' is selected from the group consisting of R and $-CH_2CH_2OH$, and

R'' is selected from the group consisting of R, $-CH_2CH_2OH$, and

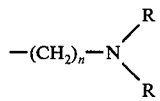

where each M is independently selected from the group consisting of H, NH$_4$, and alkali metal, "$n$" is a whole number from 1 to 3, to said dilute aqueous solutions to thereby inhibit the deposition of scale on the trays of the distillation towers; and (d) subjecting said withdrawn bottom stream to a second countercurrent multi-stage continuous distillation, (i) withdrawing an overhead vapor stream, said vapor stream containing a major proportion of stripping vapor and a portion of the ammonia from the fixed ammonia salts and reusing this overhead vapor stream as a stripping vapor in the first distillation, and (ii) withdrawing an aqueous bottom stream, said stream having a substantially reduced concentration of acid gases and ammonia as compared to said aqueous solution.

2. Process as in claim 1 wherein said dilute aqueous solution comprises a coke plant waste water and wherein the insoluble precipitate comprises calcium sulfate, calcium sulfite, calcium carbonate, calcium fluoride, calcium phosphate or mixtures thereof.

3. Process as in claim 2 wherein the acid gases comprise carbon dioxide, hydrogen sulphide, hydrogen cyanide or mixtures thereof.

4. Process as in claim 3 wherein the dilute aqueous solution immediately prior to lime addition and subsequent to the first distillation contains fixed ammonia in a concentration between about 50 and about 50,000 ppm, free ammonia in a concentration between about 3000 and about 100,000 ppm, and acid gases in a concentration between about 250 and about 50,000 ppm.

5. Process as in claim 2 wherein the trays of the distillation tower in which the second distillation is conducted are dualflow trays.

6. Process as in claim 5 wherein said dualflow trays contain substantially circular holes having an average diameter of at least one-half inch.

7. Process as in claim 6 wherein the trays have an average diameter between about 3 feet and 20 feet and contain between about 10 and about 30% hole area.

8. Process as in claim 1 wherein the scale inhibitor compound is of the formula

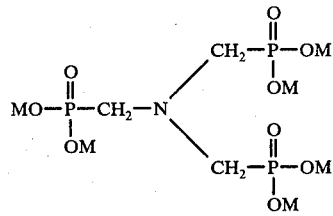

where each M is independently selected from the group consisting of H, NH$_4$, and alkali metal, the amount of said compound added being no more than a threshold amount up to about 200 ppm and in a weight ratio of said compound to the cation component of said scale-forming salts not in excess of 0.5 to 1.

9. Process as in claim 8 in which the concentration of scale inhibitor compound does not exceed about 80 ppm.

10. Process as in claim 8 in which the concentration of scale inhibitor compound does not exceed about 20 ppm.

11. Process as in claim 8 wherein the scale inhibitor compound is a water soluble alkali metal salt of an aminotri (lower alkylidene phosphonic acid).

12. Process as in claim 10 wherein the scale inhibitor compound is penta sodium aminotri (methylphosphonate).

13. Process as in claim 2 wherein said aqueous solution includes an ammoniacal liquor.

14. Process as in claim 2 wherein the said bottom water stream from step (d) is subjected to biological degradation to reduce the content of toxic substances in said bottom water stream.

15. Process as in claim 1 wherein said overhead vapor stream withdrawn in step (d) is used to provide heat for the first distillation of step (a).

16. Process as in claim 1 including the additional step of removing readily separable solids while adding said alkali to said withdrawn bottoms stream in step (b).

17. Process as in claim 3 wherein said acid gases and said free and final ammonia comprises up to 0.6 percent by weight of said aqueous solution.

18. Process as in claim 1 wherein said aqueous solution also contains tars, phenols, fluorides, chlorides, sulfates, thiosulfates and thiocyanates and includes the preliminary step of removing the tars prior to step (a).

19. Process as in claim 1 wherein the stripping vapor withdrawn in step (a) consists essentially of steam and is in the temperature range of about 140° to 265° F.

20. Process as in claim 1 wherein the stripping vapor withdrawn in step (a) consists essentially of steam and the aqueous bottom stream of step (a) is in the temperature range of about 160° to about 275° F.

21. Process as in claim 1 wherein said aqueous bottom stream in step (a) has a pH range of from 9 to 12 when measured at 50° C.

22. Process as in claim 1 wherein said aqueous solution stream in step (a) has a concentration of free ammonia of from about 3000 to about 100,000 parts per million.

23. Process as in claim 1 wherein the ratio of solution flow to vapor flow within the columns is in the range of about 10/1 to 2/1.

24. Process as in claim 1 wherein the bottom stream withdrawn in step (d) has a pH in the range of about 9.5 to about 12.

25. Process as in claim 1 wherein said lime added in step (b) comprises calcium hydroxide, calcium oxide, magnesium hydroxide, magnesium oxide or mixtures thereof.

26. Process as in claim 25 wherein said lime added in step (b) comprises pebbles of calcium oxide.

27. Process as in claim 3 wherein the scale inhibitor compound subsequent to the addition of the lime.

28. A process of purifying a waste water of a composition comprising: (a) free ammonia of a concentration above about 3000 ppm, (b) fixed ammonia in a concentration of between about 50 and about 50,000 ppm, (c) acid gases in a concentration of between about 250 and about 50,000 ppm, and (d) sulfate ion in a concentration of less than about 1500 ppm, said process comprising (a) adding lime to said waste water, said lime and fixed ammonia salts being present in amounts sufficient to form an insoluble precipitate and evolve ammonia contained in the fixed ammonia salts during a distillation of said mixture; (b) adding a threshold amount of at least one scale inhibitor compound of the general formula

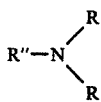

where R is

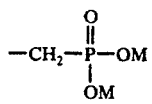

R' is selected from the group consisting of R and —CH$_2$CH$_2$OH, and R" is selected from the group consisting of R, —CH$_2$CH$_2$OH, and

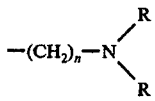

where each M is independently selected from the group consisting of H, NH$_4$, and alkali metal, "$n$" is a whole number from 1 to 3 to said dilute aqueous solutions to thereby inhibit the deposition of scale on the trays of the distillation tower in which the distillation is conducted; (c) subjecting the thus treated waste water to a countercurrent multi-stage continuous distillation, (i) withdrawing an overhead vapor stream, said vapor stream containing a major proportion of stripping vapor and a portion of the ammonia from the fixed ammonia salts, (ii) withdrawing an aqueous bottom stream.

29. Process as in claim 28 wherein the insoluble precipitate comprises calcium sulphate, calcium carbonate, calcium fluoride, calcium phosphate or mixtures thereof.

30. Process as in claim 29 wherein the distillation tower in which the distillation is conducted contains more than 12 trays.

31. Process as in claim 30 wherein the trays of the distillation tower in which the distillation is conducted are dualflow trays.

32. Process as in claim 31 wherein said dualflow trays have substantially circular holes having an average diameter of greater than about 1 inch.

33. Process as in claim 32 wherein the scale inhibitor compound is of the formula

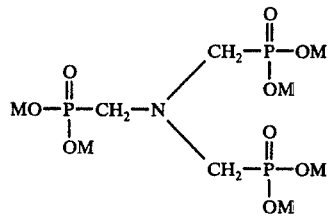

where each M is independently selected from the group consisting of H, NH$_4$, and alkali metal, the amount of said compound added being no more than a threshold amount up to about 200 ppm and in a weight ratio of said compound to the cation component of said scale-forming salts not in excess of 0.5 to 1.

34. Process as in claim 33 in which the concentration of said scale inhibitor compound does not exceed about 80 parts by weight per million parts of water.

35. Process as in claim 34 wherein the scale inhibitor compound is a water soluble alkali metal salt of an amino tri (lower alkylidene phosphonic acid).

36. Process as in claim 35 wherein the scale inhibitor compound is penta sodium aminotri (methylphosphonate).

37. Process as in claim 28 wherein the free ammonia salts are present in the waste water in a concentration between about 3000 and about 100,000 ppm, the fixed ammonia salts are present in a concentration between about 3000 and about 5000 ppm, and carbon dioxide is present in a concentration of between about 250 and about 700 ppm.

38. Process as in claim 37 wherein the concentration of sulfate ion is less than about 800 ppm.

* * * * *